J. H. KINEALY.
KEROSENE BURNER.
APPLICATION FILED SEPT. 30, 1916.
1,271,325.
Patented July 2, 1918.
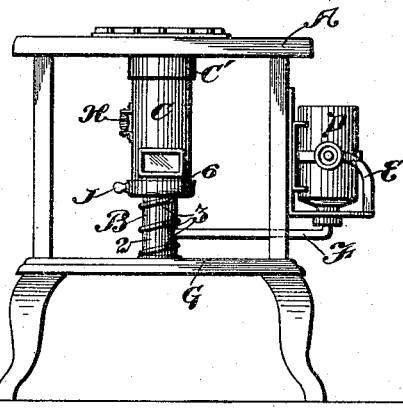
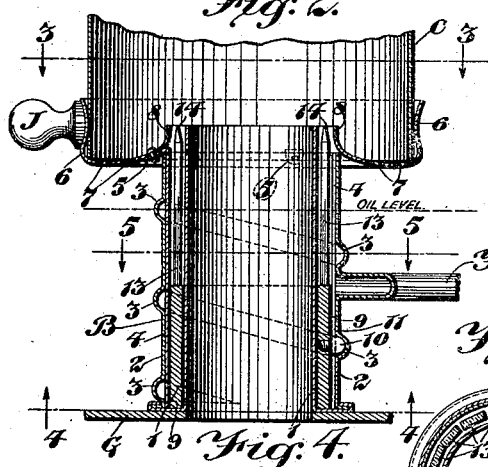
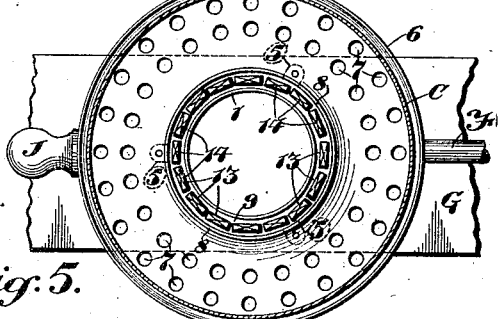
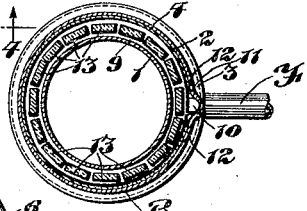
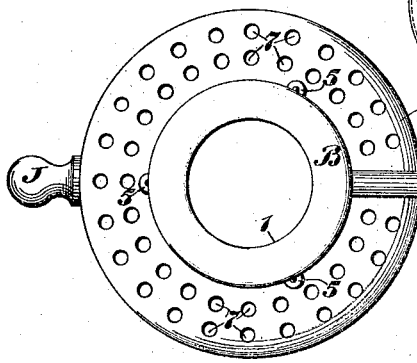
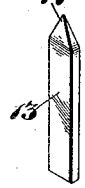
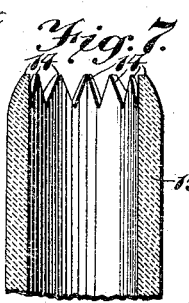
Attest:
Charles A. Becker
Inventor
John H. Kinealy

UNITED STATES PATENT OFFICE.

JOHN H. KINEALY, OF FERGUSON, MISSOURI.

KEROSENE-BURNER.

1,271,325. Specification of Letters Patent. Patented July 2, 1918.

Application filed September 30, 1916. Serial No. 123,079.

*To all whom it may concern:*

Be it known that I, JOHN H. KINEALY, a citizen of the United States, residing at Ferguson, in the county of St. Louis and State of Missouri, have invented a new and useful Improvement in Kerosene-Burners, of which the following, is a full, clear, and exact specification, reference being had to the accompanying drawings, which form a part thereof.

My invention relates to kerosene burners to be used in connection with kerosene lamps and stoves.

The object of my invention is to provide a kerosene burner for the combustion of ordinary kerosene and by which the use of the usual woven, combustible wick will be avoided.

My invention is fully shown in the accompanying drawings where similar letters are used to designate similar parts. Figure 1 shows a stove equipped with a burner embodying my invention; Fig. 2 is an enlarged sectional view of a burner; Fig. 3 is a sectional view along the line 3—3 of Fig. 2; Fig. 4 is a sectional view along the line 4—4 of Fig. 2; Fig. 5 is a sectional view along the line 5—5 of Fig. 2; Fig. 6 is an enlarged view of one part of the burner; and Fig. 7 is a view showing an alternate construction of the wick-portion of the burner.

Referring to the figures, A is a stove frame, of ordinary construction, provided with a burner B, which has a suitable chimney C. D is a reservoir for kerosene which is connected to the burner by means of a supply pipe F. The reservoir D is supported in a frame E and is provided with suitable means whereby the oil is kept at a constant "oil level" in the burner B. The means used for preserving a constant level for kerosene burners is so common and well known that I have not shown it in detail in connection with the reservoir D, since the construction of this means forms no part of my invention, although the specific embodiment of my invention of the burner shown in the drawings is adapted for use in connection with an oil level which is maintained substantially constant in the burner. The burner B is supported on a shelf-like part G of the stove A. The chimney C rests on the burner and is provided with a handle H by which it may be raised off the burner for lighting purposes. C' is a depending-portion inside of which the chimney C slides, and which acts to hold in position the upper end of the chimney.

The burner comprises a well which is formed with an inner wall 1 and an outer wall 2. The outer wall has formed in it a helical groove 3. Loosely fitting inside of the wall 2 there is a cylindrical member 4 which is provided at its upper end with lugs 5 which are attached, by rivets or other suitable means, to the chimney support 6. The lower part of this chimney support is provided with a plurality of openings 7 through which air is admitted for combustion inside of the chimney. The inner part of the support 6 is provided with an upturned lip 8 which terminates on a level with the upper part of the inner wall 1. The inner wall 1 is of the shape of a cylindrical tube opened at both ends so that air can pass through it upwardly to the top of the burner and be used for combustion. 9 is a supporting member movable between the walls 1 and 2, and provided with a roundheaded screw 10, the head of which is adapted to engage with the inside of the helical groove 3. The member 4 is provided with a slot 11 through which the head of screw 10 projects, and its edges 12 contact with the sides of the head of 10. When the member 6 is turned by means of the handle J, one edge 12 of the slot 11 presses against the screw 10 and makes the member 9 turn; as 9 turns the screw 10 travels in the helical groove 3 and thus causes the member 9 to be raised or lowered. In the drawings the member 9 is shown in its lowest position. 13 is a wick-portion which is made of a porous, refractory solid, and preferably of a plurality of strips of this material. These strips are preferably made of the same length and each has its upper end 14 reduced or sharpened to form a lighting point or place. In Fig. 7 is shown a construction of the wick-portion where this portion is made of a single piece of porous, refractory material having its upper end, or lighting end, provided with a plurality of teeth.

The oil level of the kerosene in the burner B must be at a distance from the upper end of the inner wall 1 that depends upon the porosity of the material of which the wick-portion is made. If the oil level is too far below the upper end 14 of the wick-portion the oil will not be drawn up therethrough with sufficient rapidity to support a large flame in the burner.

The operation of the burner is as follows: The member 6 is turned, by means of the handle J, until the upper end of the wick-portion is raised above the upper end of the inner wall 1 and the lips 8, then the chimney C is lifted and a lighted match is inserted beneath the chimney and brought in contact with one or more of the reduced lighting points or places and the kerosene lighted. If the upper end of the wick-portion is not reduced so as to present to the match a small or reduced point or place, it will be found practically impossible to light the burner with an ordinary match, because the heat will be conducted away from the point of application so fast that the oil and the wick-portion at this point will not be raised to the temperature of the ignition point of the oil. When one of the points 14 is lighted the wick-portion will burn at this point and communicate heat to neighboring points so that gradually the whole burner will be lighted at its upper end. I prefer to make the wick-portion of a plurality of strips so that burners of different sizes may be built up simply by the use of different numbers of strips, the number of strips used depending upon the size of the burner. The objection to the use of a wick-portion formed of a single piece, as is shown in Fig. 7, is that it is necessary to make a different wick-portion for each size of burner even if all the burners used wick-portions having the same thickness of walls 15; and a further objection to the use of a wick-portion made of a single piece is, that if the wick-portion should be broken it becomes necessary to replace the whole wick-portion, while if the wick-portion is made of a plurality of strips and one of these strips should be broken, this broken one may be replaced by a new one which will be used with the old strips.

When it is desired to increase the flame, the handle J is turned so as to raise the upper ends of the wick-portion, and when it is desired to decrease the flame, the handle J is turned so as to lower the wick-portion. By turning the handle J, the wick-portion may be raised or lowered so as to give, within limits, substantially any desired flame. The air for the combustion enters through the interior of the tube forming the inner walls 1 of the burner and also through the perforations 7 in the member 6.

What I claim as new and desire to secure by Letters Patent, is:

1. A kerosene burner comprising a well, and a wick-portion in said well composed of a plurality of independently removable solid strips each formed of a porous refractory material.

2. A kerosene burner comprising a well, and a wick-portion in said well composed of a plurality of independently removable solid strips each formed of a porous refractory material and one of said strips having its upper end reduced to form a lighting place.

3. A kerosene burner comprising a well, and a wick-portion in said well composed of a plurality of independently removable solid strips each formed of a porous refractory material and having its upper end reduced to form a lighting place.

4. A kerosene burner comprising a well formed between two endless walls spaced apart, and a wick-portion in said well composed of a plurality of solid strips each formed of a porous refractory material.

5. A kerosene burner, comprising a well formed between two endless walls spaced apart, and a wick-portion in said well composed of a plurality of independently removable solid strips each formed of a porous refractory material.

6. A kerosene burner comprising a well formed between two endless walls spaced apart, and a wick-portion in said well composed of a plurality of solid strips each formed of a porous refractory material and one of said strips having its upper end reduced to form a lighting place.

7. A kerosene burner comprising a well formed between two endless walls spaced apart, and a wick-portion in said well composed of a plurality of solid strips each formed of a porous refractory material and having its upper end reduced to form a lighting place.

8. A kerosene burner comprising a well formed between two endless walls spaced apart, a wick-portion in said well composed of a plurality of solid strips each formed of a porous refractory material and having its upper end reduced to form a lighting place, and means whereby the flame may be increased or decreased as desired.

In witness whereof I have signed my name to this specification.

JOHN H. KINEALY.